US008009220B2

(12) United States Patent
Kogusuri (10) Patent No.: US 8,009,220 B2
(45) Date of Patent: Aug. 30, 2011

(54) IMAGE REPRODUCTION APPARATUS (75) Inventor: Koji Kogusuri, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1715 days.

(21) Appl. No.: 11/130,956

(22) Filed: May 17, 2005

(65) Prior Publication Data

US 2005/0261025 A1 Nov. 24, 2005

(30) Foreign Application Priority Data

May 20, 2004 (JP) ................................. 2004-149947

(51) Int. Cl.
*H04N 5/222* (2006.01)
*H04N 5/225* (2006.01)

(52) U.S. Cl. ............ 348/333.06; 348/207.1; 348/333.01

(58) Field of Classification Search .................... 368/38, 368/117–119; 358/906, 909.1; 348/372
See application file for complete search history.

(56) References Cited

U.S. PATENT DOCUMENTS

| 5,381,179 | A | * | 1/1995 | Kashimura | .................... | 348/376 |
| 6,067,116 | A | * | 5/2000 | Yamano et al. | ............... | 348/372 |
| 7,084,921 | B1 | * | 8/2006 | Ogawa | .......................... | 348/372 |

FOREIGN PATENT DOCUMENTS

| JP | 05-191698 A | 7/1993 |
| JP | 2003-188960 A | 7/2003 |
| JP | 2004-080381 A | 3/2004 |

OTHER PUBLICATIONS

Aug. 11, 2009 Japanese Office Action that issued in Japanese Patent Application No. 2004-149947.

* cited by examiner

*Primary Examiner* — Thai Tran
*Assistant Examiner* — Heather Jones
(74) *Attorney, Agent, or Firm* — Cowan, Liebowitz & Latman, P.C.

(57) ABSTRACT

An imaging apparatus includes a recording and reproducing unit which records an image data obtained by an image pickup unit on a recording medium and reproduces the image data from the recording medium; a communication unit which transmits the image data to an external device through radio communication; a power supply which supplies electric power to the communication unit; a display unit which displays an image according to the image data, a position of the display unit being arbitrarily movable; a display control unit which displays the image when the display unit is located at a second position, and inhibits the image display when the display unit is located at a first position; and a power supply control unit which stops the electric power supply to the communication unit when the display unit is located at the first position, and supplies the electric power to the communication unit when the display unit is located at the second position.

21 Claims, 6 Drawing Sheets

IMAGE REPRODUCTION APPARATUS

BACKGROUND OF THE INVENTION

1. Field of the Invention

The present invention relates to an image reproduction apparatus, more specifically to the image reproduction apparatus comprising radio communication means.

2. Related Background Art

Conventionally, a video camera which captures an image to record image signals thereof in a recording medium such as a memory card is well known. Of this kind of video camera, recently some of video cameras, which include a radio communication function and thereby can transmit image data stored in the memory card to an external device through a radio communication, come on the market.

In the communication by radio network connection, there is a fear that a radio wave is intercepted. Therefore, the devices provided with the radio communication function usually has a function of discriminating whether the device is permitted to be connected, by an encrypted authentication so that only the particularly permitted device can be connected to a radio communication network environment (for example, see Japanese Patent Application Laid-Open No. 2004-118488).

In order to use encrypted authentication to maintain security of a radio network, it is necessary for a user to make a complicated setting of the radio communication device. Further, it is necessary for the user to previously know information on the connected device and the like.

For a portable radio communication device, sometimes the portable radio communication device is used without making the security setting so as to be easily connected to the network.

However, when the portable radio communication device such as a video camera having the radio communication function is used without making the security setting, the external device can easily get access to the recording medium mounted on the video camera. Therefore, the recorded image data may be easily erased from the external device, and the image data recorded in the recording medium may be easily read from the external device.

That is, there is a fear that the external device performs the operation that is not intended by the user of the video camera.

Whenever the connection setting is changed according to each network environment, it is necessary to make the complicated setting.

SUMMARY OF THE INVENTION

An object of the invention is to solve the above problems.

Another object of the invention is to inhibit or restrict the user's not-intended-access to the data recorded in the recording medium from the external device.

In order to solve the above problem, and in order to achieve the above objects, an imaging apparatus according to a scope of the invention comprises: image pickup means; recording and reproducing means for recording an image data obtained by the image pickup means on a recording medium and for reproducing the image data from the recording medium; a communication unit which transmits the image data to an external device through radio communication; a power supply which supplies electric power to the communication unit; a display unit which displays an image according to the image data, a position of the display unit being arbitrarily movable; and control means for controlling the electric power supply to the communication unit according to the position of the display unit, wherein the control means starts the electric power supply to the communication unit in response to the change in the position of the display unit from a first position to a second position, and the control means stops the electric power supply to the communication unit in response to the change in the position of the display unit from the second position to the first position.

These and other objects and advantages of the invention become more apparent by the following detail description of an embodiment referring to the accompanying drawings.

DESCRIPTION OF THE PREFERRED EMBODIMENTS

Referring now to the drawings, preferred embodiments of the invention is explained in detail below.

Figure 1:
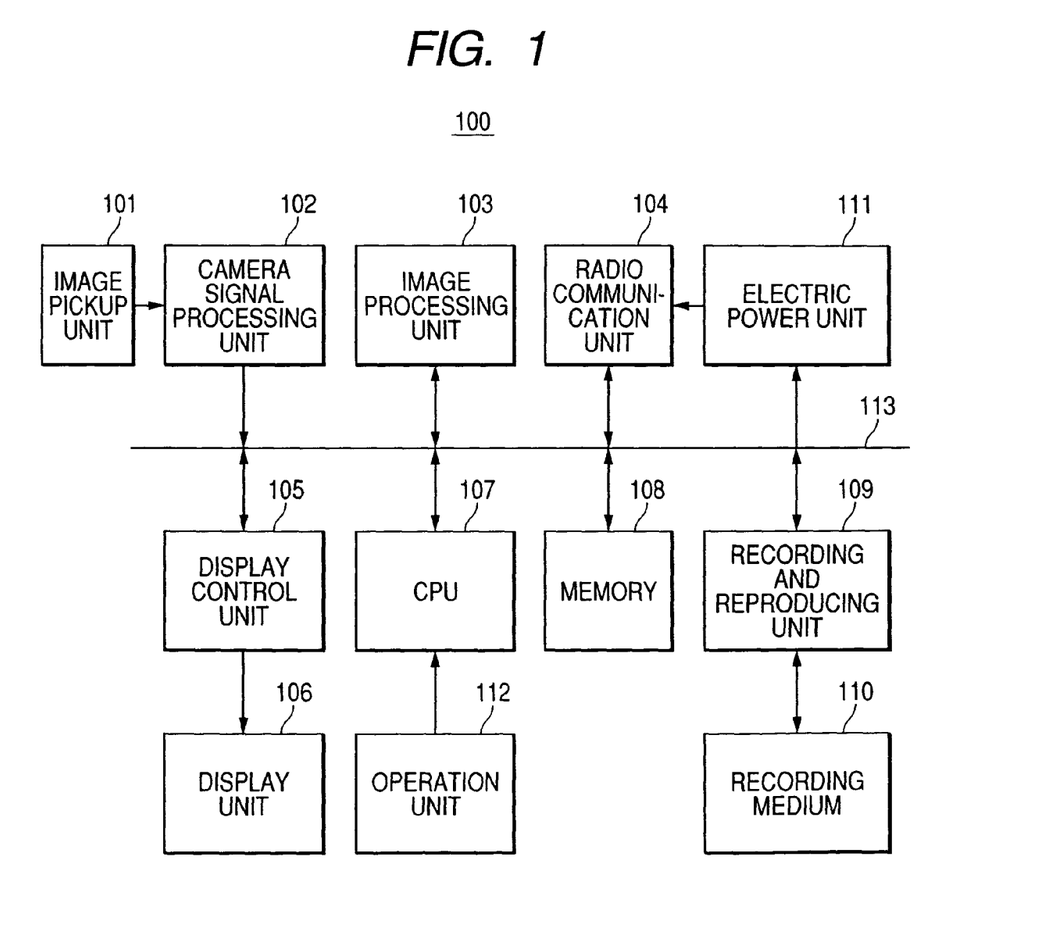
FIG. 1 is a block diagram showing a configuration of a video camera to which the invention is applied.

FIG. 1 is a block diagram showing a schematic configuration of a video camera 100 according to the invention.

An image pickup unit 101 has a lens unit and an image pickup element. The image pickup unit 101 converts an optical image into an electric image signal to output the electric image signal. A camera signal processing unit 102 performs well-known camera signal processing, such as gamma correction and color balance adjustment, on the image signal output from the image pickup unit 101. In recording, an image processing unit 103 compresses the image signal, obtained by the camera signal processing unit 102, and transmits the compressed image signal to a recording and reproducing unit 109. In reproducing, the image processing unit 103 expands the image data reproduced from a recording medium 110.

A radio communication unit 104 transmits and receives the image data and the like to and from the external device through the radio communication with wireless LAN (Local Area Network) and the like. A display control unit 105 controls an image display operation of a display unit 106. The display control unit 105 also controls turn-on and turn-off of the display unit 106 according to a position of the display unit 106 as described later. For example, the display unit 106 includes a liquid crystal display panel. A CPU 107 controls the whole of the video camera 100. The data from and to the camera signal processing unit 102, the image processing unit 103, and the recording and reproducing unit 109 is temporarily stored in a memory 108.

The recording and reproducing unit 109 records the data processed by the image processing unit 103 on a recording medium 110. The recording and reproducing unit 109 reproduces the image data recorded on the recording medium 110. The recording medium 110 includes a magnetic disk, an optical disk, the memory card, a magnetic tape, and the like. An electric power unit 111 supplies electric power to each unit of the video camera 100. The electric power unit 111 also controls the power supply to the radio communication unit 104 according to directions of the CPU 107. An operation unit 112 has various switches such as a power switch and a record trigger switch. The operation unit 112 outputs a control signal according to user's switch operation to the CPU 107. A bus 113 transmits and receives the data among the units.

Then, the recording operation of the video camera 100 is explained.

The camera signal processing unit 102 processes the image signal, output from the image pickup unit 101, and writes the processed image signal in the memory 108. The image processing unit 103 encodes the image data written in the memory 108. The image processing unit 103 compresses the information amount of the coded image data to write the image data in the memory 108. The recording compressed image data written in the memory 108 is recorded on the recording medium 110 through the recording and reproducing unit 109.

At this point, the display unit 106 displays the image data supplied to the camera signal processing unit 102.

When the direction to transmit the image data to the external device is issued from the operation unit 112, the CPU 107 controls the radio communication unit 104 to transmit the compressed recording image data written in the memory 108 to the external device.

Then reproducing operation is explained.

The compressed image data recorded on the recording medium 110 is read by the recording and reproducing unit 109 to be written in the memory 108. The image processing unit 103 expands the compressed image data written in the memory 108 and writes the decompressed image data into the memory 108. The display control unit 105 reads the decompressed image data from the memory 108 to output it to the display unit 106. Therefore, the image reproduced from the recording medium 110 is displayed.

When the direction to transmit the image data to the external device is issued from the operation unit 112, the CPU 107 controls the radio communication unit 104 to transmit the reproduced image data written in the memory 108 to the external device.

Figure 2A:
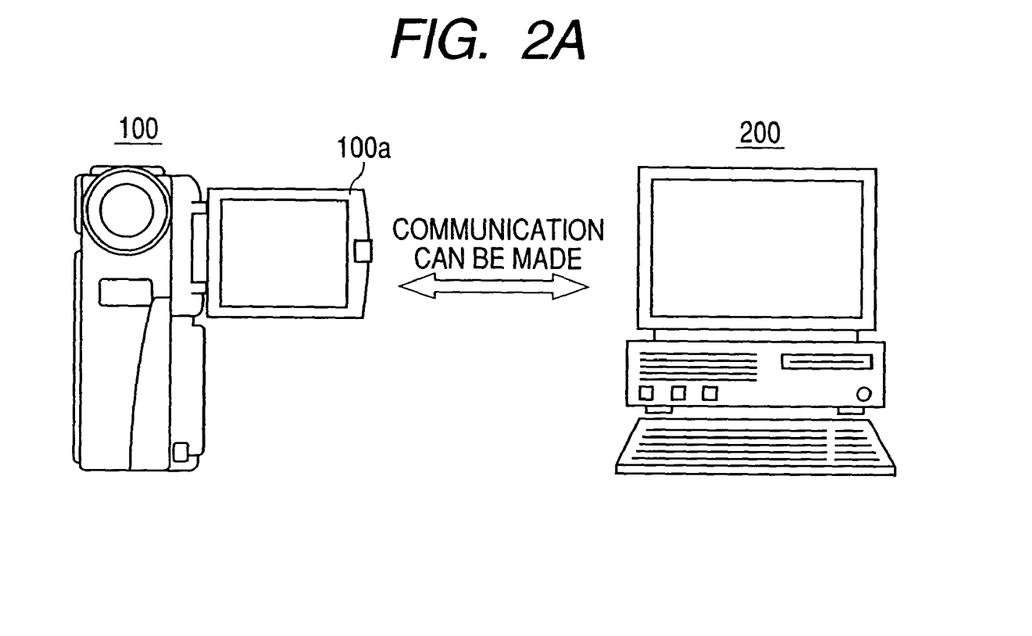
FIGS. 2A and 2B show an example of a communication status between a video camera and an external device.
Figure 2B:
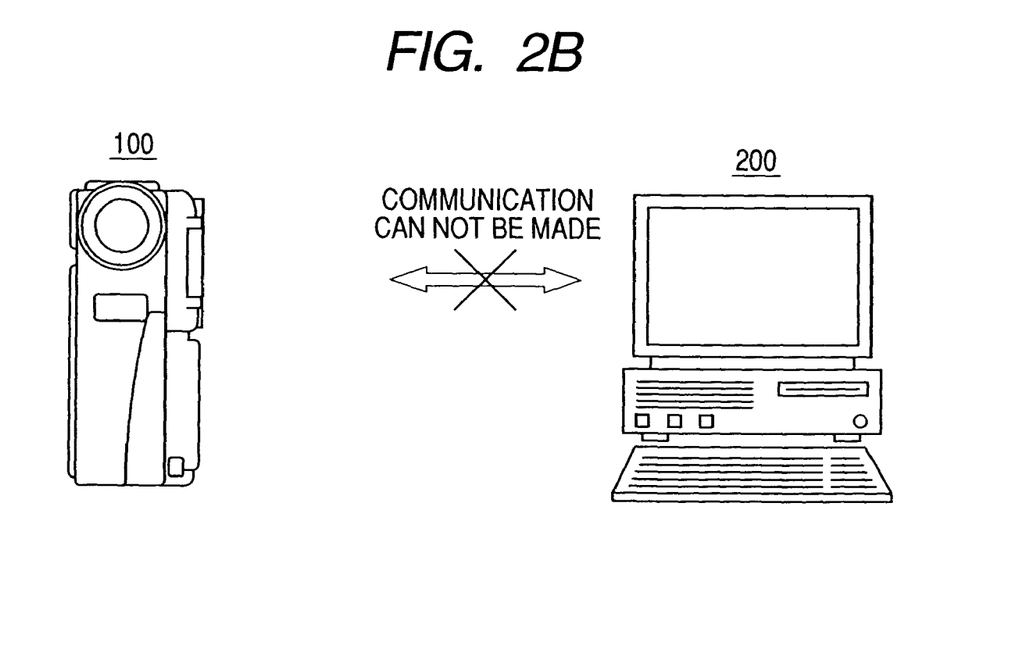

FIGS. 2A and 2B show a communication operation status between the video camera 100 of FIG. 1 and the radio communication unit 104.

In FIGS. 2A and 2B, the video camera 100 is arranged so as to communicate the image data and various kinds of data with a PC (Personal Computer) 200 which is of the external device, by using the radio communication unit 104. The video camera 100 has a liquid crystal panel (including the display unit 106) 100a which the user can arbitrarily open and close. The display control unit 105 of FIGS. 2A and 2B detects a position of the liquid crystal panel 100a. When the liquid crystal panel 100a is opened, the display control unit 105 displays the image on the display unit 106 while turning on the display unit 106. When the liquid crystal panel 100a is closed, the display control unit 105 inhibits the image display while turning off the display unit 106.

As shown in FIG. 2A, the video camera 100 can make the communication with the PC 200, when the liquid crystal panel 100a is opened, namely the display unit 106 is turned on. In FIG. 2A, when the video camera 100 is in a reproduction mode, the PC 200 can get access to the recording medium 110 through the radio communication to read and write the image data. The recording medium 110 is mounted to the video camera 100. Further, when the video camera 100 is in an image-capture mode, the video camera 100 can transmit to the PC 200 the image data captured by the image pickup unit 101 and written in the memory 108.

As shown in FIG. 2B, the video camera 100 stops the electric power supply to the communication control unit 104 of FIG. 1 to inhibit the communication with the PC 200, when the liquid crystal panel 100a is closed, namely the display unit 106 is turned off. When the video camera 100 is in the communication with the PC 200 while the display unit 106 is turned on, when the liquid crystal panel 100a is closed, since the electric power supply to the communication control unit 104 is stopped, the video camera 100 disconnects the communication with the PC 200.

Figure 4:
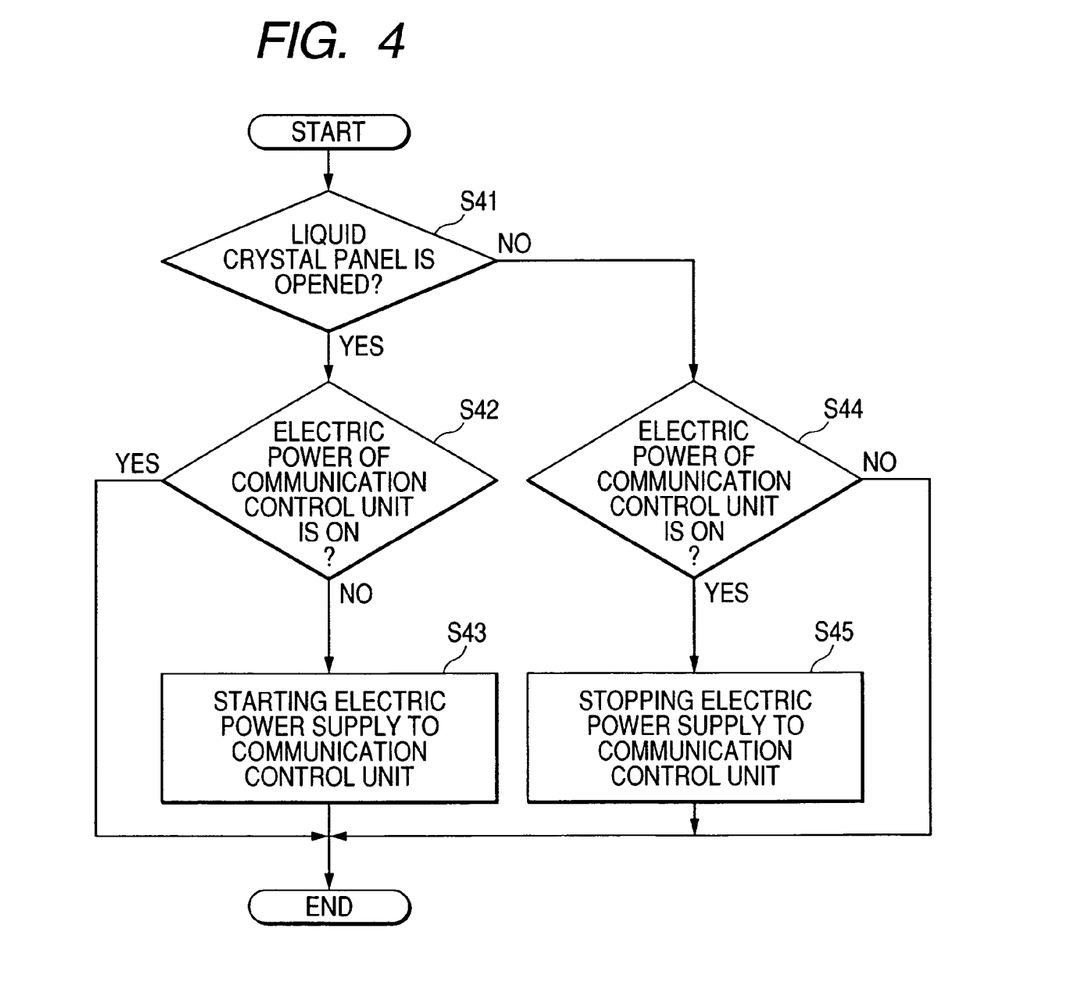
FIG. 4 is a flowchart showing a control operation of communication with the external device by the video camera.

FIG. 4 is a flowchart showing the operation of the CPU 107 according to the open and close states of the liquid crystal panel 100a shown in FIGS. 2A and 2B. The CPU 107 periodically performs the flow of FIG. 4.

The CPU 107 causes the display control unit 105 to confirm whether the liquid crystal panel 100a is opened or not, namely whether the display unit 106 is turned on or off (S41). When the liquid crystal panel 100a is opened, The CPU 107 confirms whether the communication control unit 104 is turned on or off (S42). When the communication control unit 104 is turned off, The CPU 107 determines that the liquid crystal panel 100a is changed from the close state to the open state, and the CPU 107 controls the electric power unit 111 to start the electric power supply to the communication control unit 104 (S43). In Step S42, when the communication control unit 104 is already turned on, the CPU 107 directly ends the process.

On the other hand, when the liquid crystal panel 100a is closed at S41, the CPU 107 confirms whether the communication control unit 104 is turned on or off (S44). When the communication control unit 104 is turned on, the CPU 107 determines that the liquid crystal panel 100a is changed from the open state to the close state, and the CPU 107 controls the electric power unit 111 to stop the electric power supply to the communication control unit 104 (S45). In Step S44, when the communication control unit 104 is already turned off, the CPU 107 directly ends the process.

In the embodiments shown in FIGS. 2A, 2B, and FIG. 4, the turn-on and turn-off of the display unit 106 are changed according to the open and close states of the liquid crystal panel 100a, and the electric power supply to the communication control unit 104 is controlled according to the turn-on and turn-off of the display unit 106.

That is, when the liquid crystal panel 100a is changed from the open state to the close state, since the CPU 107 stops the electric power supply to the communication control unit 104, the radio communication is never made with the external device.

Therefore, the user can prevent the data write and the data read from the external device without proper authorization only by closing the liquid crystal panel.

In the embodiment, although the electric power supply to the communication control unit 104 is stopped according to the closing of the liquid crystal panel 100a, the electric power supply to other function blocks is not stopped. Therefore, for example, the image capture operation and the like can be performed if a viewfinder is provided in addition to the liquid crystal panel. When the liquid crystal panel 100a is closed, the whole of the video camera 100 can be turned off by operating the operation unit 112.

The video camera 100 including the communication control unit 104 can be turned off by issuing directions to turn off the video camera 100, from the operation unit 112 while the liquid crystal panel 100a is opened.

In the embodiment, when the liquid crystal panel 100a is closed while the communication is being made with the external device, the communication with the external device is directly disconnected. However, it is also possible that the communication is ended after the notification of the communication end is provided to the external device.

In the flow shown in FIG. 4, the CPU 107 confirms the position of the liquid crystal panel 100a by asking the display control unit 105 for the electric power status of the display unit 104. However, the invention is not limited to the flow shown in FIG. 4. For example, it is possible that the CPU 107 directly confirms the position of the liquid crystal panel 100a.

Figure 3A:
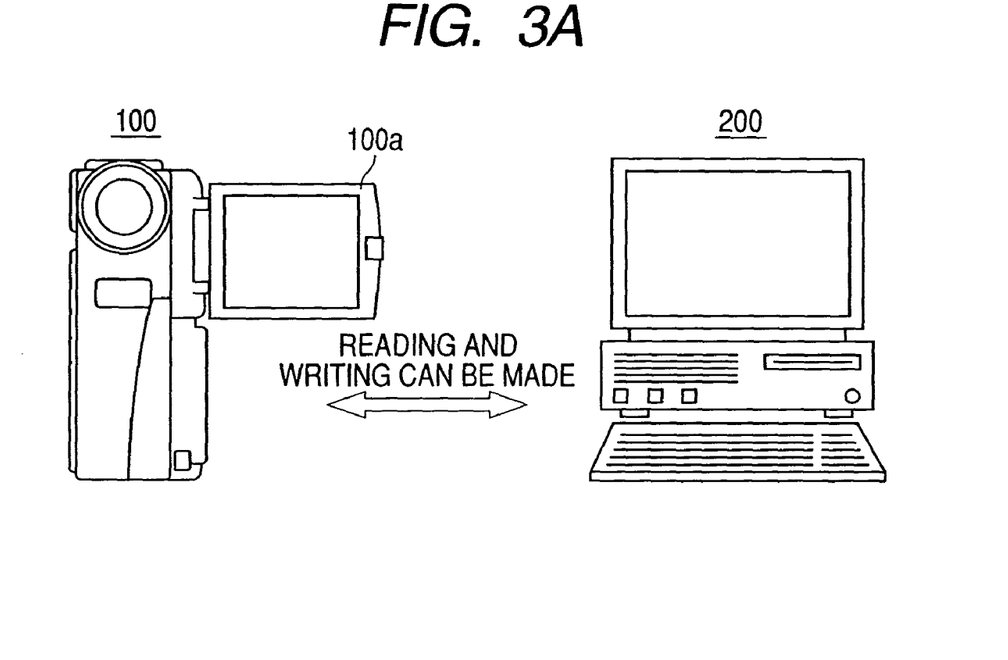
FIGS. 3A and 3B show another example of the communication status between the video camera and the external device.
Figure 3B:
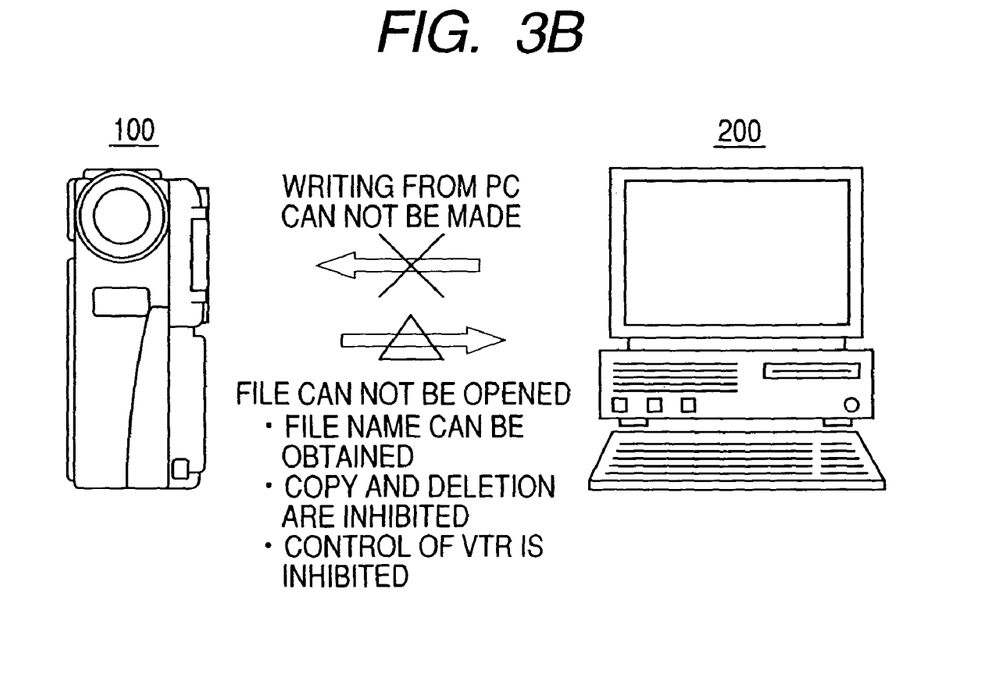

FIGS. 3A and 3B show another example of the communication operation between the video camera 100 of FIG. 1 and the external device.

As shown in FIG. 3A, when the liquid crystal panel 100a is opened, the video camera 100 can make the communication with the PC 200. In the status shown in FIG. 3A, when the video camera 100 is in the reproduction mode, the PC 200 can get access to the recording medium 110 mounted on the video camera 100 to read and write the image data. When the video camera 100 is in the image-capture mode, the PC 200 can cause the image data capture by the image pickup unit 101 and written in the memory 108 to be transmitted to the PC 200.

On the other hand, when the liquid crystal panel 100a is closed as shown in FIG. 3B, the communication can be made between the video camera 100 and the PC 200. However, the image data file recorded on the recording medium 110 is inhibited from opening, and the read and write of the file for the recording medium 110 are also inhibited. Further, in the image-capture mode, the remote operation of the camera from the PC 200 is also inhibited.

Figure 5:
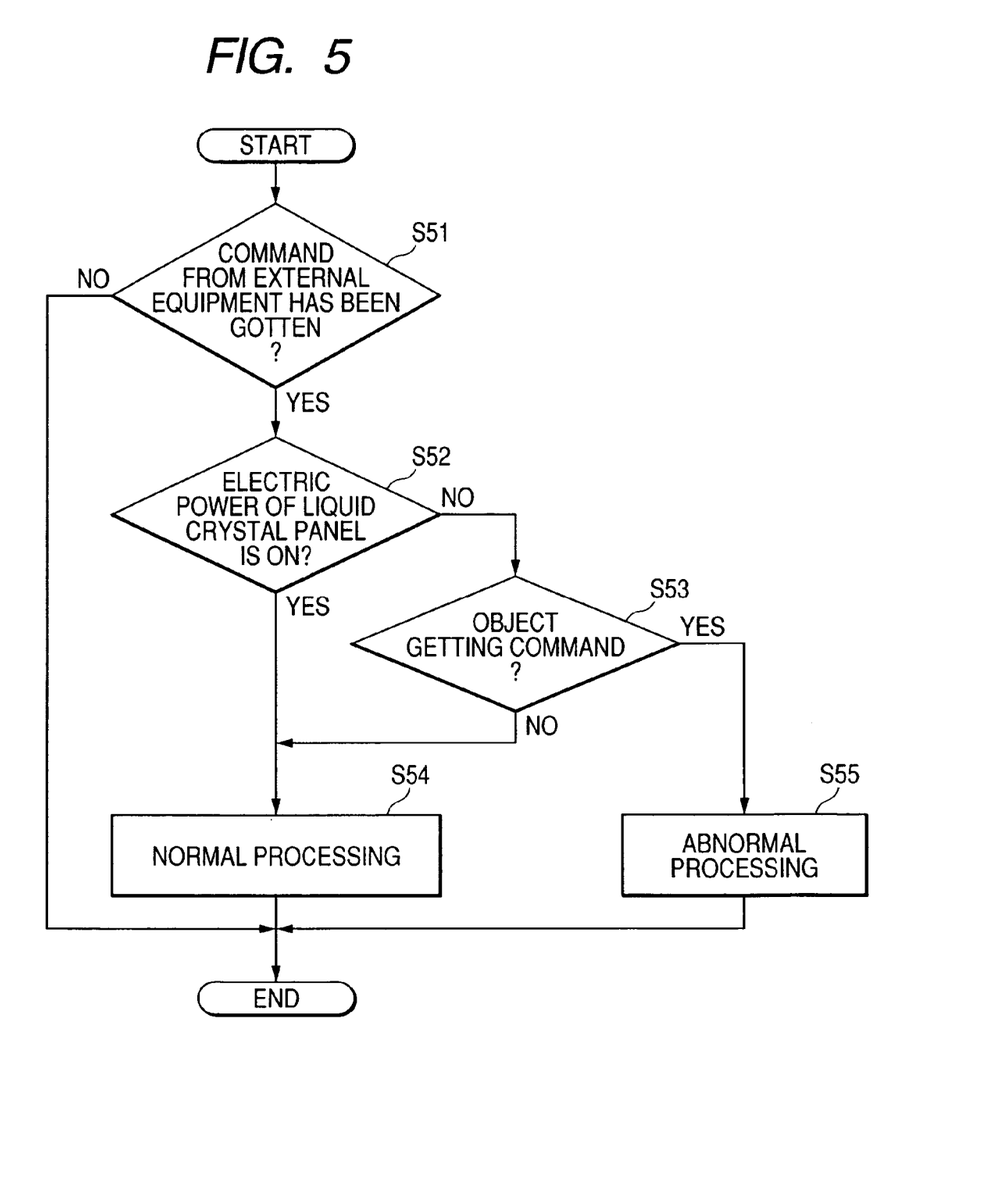
FIG. 5 is a flowchart showing a control operation of communication with the external device by the video camera.

FIG. 5 is a flowchart showing the operation of the CPU 107 according to the open and close states of the liquid crystal panel 100a like FIGS. 3A and 3B. It is assumed that the recording medium 110 is mounted on the video camera 100, and it is assumed that the video camera 100 is in the communication with the PC 200 through the communication control unit 104. The flow of FIG. 5 is periodically performed by the CPU 107.

In FIG. 5, the CPU 107 determines whether the CPU 107 obtains a command from the external device (PC 200) (S51). When the CPU does not obtain the command, the CPU 107 ends the flow. When the CPU obtains the command, the CPU 107 causes display control unit 105 to confirm whether the liquid crystal panel 100a is opened or not, namely whether the display unit 100 is turned on or off (S52).

When the display unit 106 is turned on, the CPU 107 performs the process according to the control command from the external device, and the CPU 107 ends the flow (S54).

When the display unit 106 is turned off (No in S52), the CPU 107 determines whether the command obtained from the external device is the command to obtain an object such as the image data recorded in the recording medium 110 (S53). When the command is the object obtaining command (YES in S53), the CPU 107 informs the external device of an object obtaining process error (abnormal processing), and the CPU 107 ends the flow (S55).

When the command is not the object obtaining command (NO in S53), the CPU performs the obtained command and ends the flow (S54).

In the flow shown in FIG. 5, when the CPU 107 receives the command to obtain the object recorded on the recording medium 110 while the display unit 106 is turned off, the object transmission to the external device is inhibited. When the CPU 107 receives the command to write the data onto recording medium 110 while the display unit 106 is turned off, it is also possible to inhibit the write of the object, which obeys the write command.

Then, other embodiments is explained.

It is assumed that the communication control unit 104 makes the communication using the wireless LAN communication and the communication control unit 104 can be connected in an infrastructure connection mode, to a main network and in an adhoc connection mode to a temporarily formed network.

Figure 6:
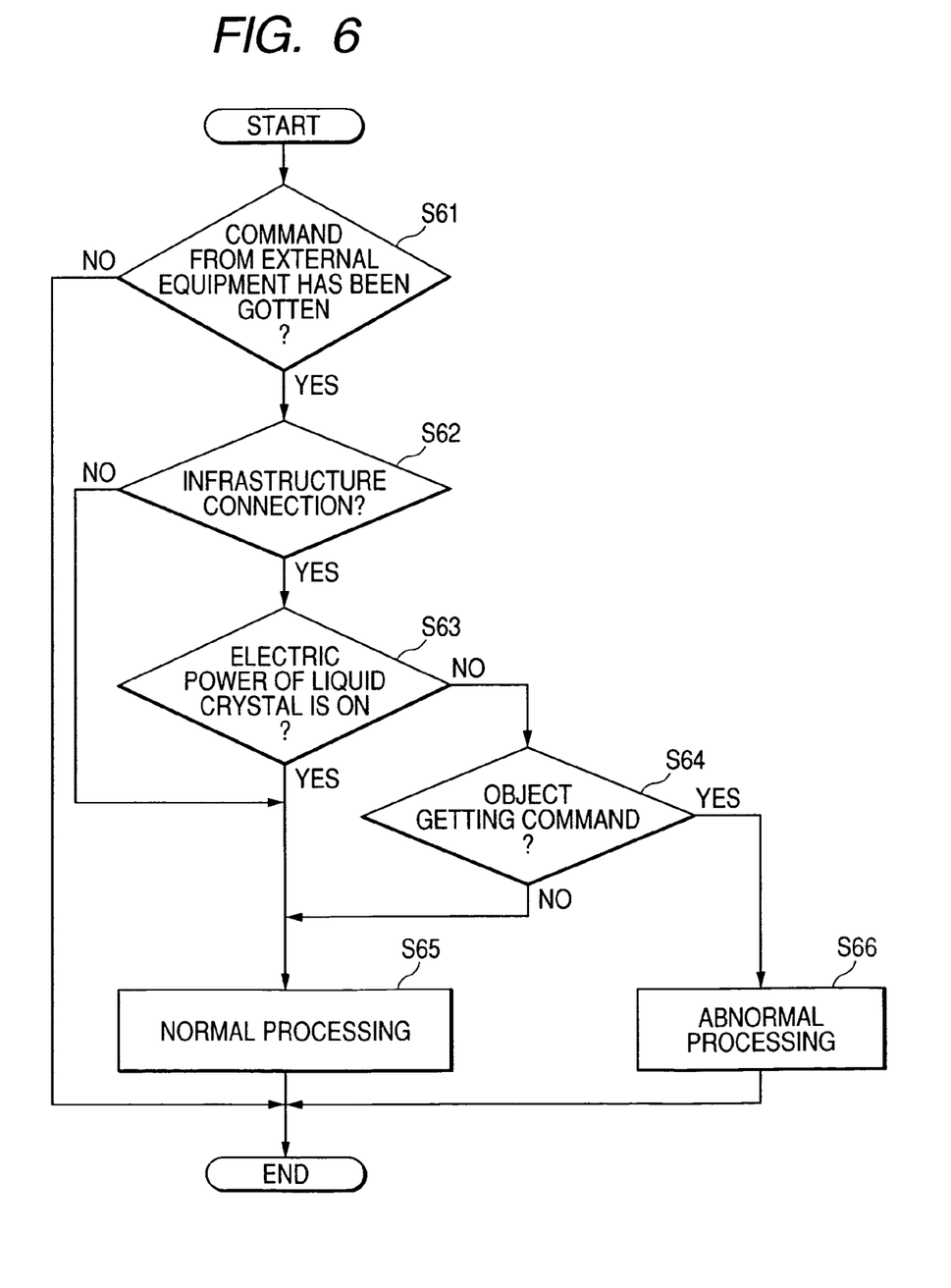
FIG. 6 is a flowchart showing a control operation of communication with the external device by the video camera.

FIG. 6 is a flowchart showing the operation of the CPU 107 according to the electric power status of the display unit 106 in the case that the communication control unit 104 has the above function. It is assumed that the recording medium 110 is mounted on the video camera 100 and the video camera 100 is in the communication with the external device (PC 200) through the communication control unit 104.

The CPU 107 determines whether the CPU 107 obtains the command from the external device (S61). When the CPU 107 does not obtain the command, the CPU 107 ends the flow. When the CPU 107 obtains the command, the CPU 107 determines whether the communication control unit 104 is connected in the infrastructure connection mode (S62). When the communication control unit 104 is connected in the infrastructure connection mode, the CPU 107 causes the display control unit 105 to confirm whether the display unit 106 is turned on or off (S63). When the display unit 106 is turned off (NO in S63), the CPU 107 determines whether the command obtained from the external device is the command to obtain the object recorded on the recording medium 110 (S64). When the command is the object obtaining command, the CPU 107 inhibits the object obtainment from the recording medium 110, and the CPU 107 informs the external device of the object obtaining process error (abnormal processing) and ends the flow (S66).

On the other hand, when the communication control unit 104 is not connected in the infrastructure connection mode (NO in S62), when the display unit 106 is turned on (YES in S63), or when the command is not the object obtaining command (NO in S64), the CPU 107 performs the command obtained from the external device, and then the CPU 107 end the flow (S65).

In S62 of the flow shown in FIG. 6, whether the process is performed is determined by the infrastructure connection mode and the adhoc connection mode of the wireless LAN communication. However, it is possible that whether the process is performed is determined by the active communication mode, such as a Bluetooth connection mode and a wireless LAN connection mode, through which the command is obtained.

Thus, according to the embodiments of the invention, the electric power is supplied to the communication control unit when the display unit is turned on, and the electric power supply to the communication control unit is stopped when the display unit is turned off. Therefore, the communication with the external device can easily be controlled by the operation having high visibility such that the display status of the displaying means such as the liquid crystal panel is changed.

When the video camera is in the communication with the external device, and only when determined that the display unit is turned on, the user can be informed of the communication status between the video camera and the external device by executing the command obtained from the external device, and the operation out of the user's understanding can be prevented.

When determined that the command obtained from the external device is the command to obtain the object recorded on the recording medium, the mis-erase of the object and the unrecognized object obtainment can be inhibited by removing the process.

Further, only when determined that the communication mode of the communication control unit is the predetermined communication mode, the command obtained from the external device is executed, thereby inhibiting unrecognized access from the networks except for the predetermined network.

Note that the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, a Blu-ray DISC, and a DVD (a DVD-ROM, a DVD-R, a DVD-RW and a DVD-RAM).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board—or function expansion unit performs all or a part of the actual processing so that the functions of the foregoing embodiments can be implemented by this processing.

Many widely different embodiments of the present invention may be constructed without departing from the scope of the present invention. It should be understood that the present invention is not limited to the specific embodiments described in the specification, except as defined in the appended claims.

This application claims priority from Japanese Patent Application No. 2004-149947 filed on May 20, 2004, which is hereby incorporated by reference herein.

What is claimed is:

1. A communication apparatus comprising:
a reading unit configured to read image data from a recording medium;
a display unit configured to display an image according to the image data read from the recording medium, a positional state of the display unit being changeable between an open state and a closed state;
a communication unit configured to communicate with an external device via wireless communication, the communication unit transmitting the image data read from the recording medium to the external device via the wireless communication;
a control unit configured to control operation of the communication unit according to the positional state of the display unit, the control unit controlling the communication unit such that the communication unit communicates with the external device and the image data read out from the recording medium is transmitted to the external device if the display unit is in the open state, and the communication unit maintains communication with the external device and the image data read out from the recording medium is inhibited from being transmitted to the external device if the display unit is in the closed state.

2. An apparatus according to claim 1, further comprising:
an image pickup unit; and
a writing unit configured to write image data obtained by the image pickup unit on in the recording medium,
wherein the communication unit transmits the image data obtained by the image pickup unit to the external device,
wherein the control unit controls the communication unit such that the image data obtained by the image pickup unit is transmitted to the external device if the display unit is in the open state, and the image data obtained by the image pickup unit is inhibited from being transmitted to the external device if the display unit is in the closed state.

3. An apparatus according to claim 1, wherein
the display unit displays the image in the open state and stops displaying the image in the closed state.

4. A communication apparatus comprising:
a recording unit configured to record image data on a recording medium;
a display unit configured to display an image, a positional state of which is changeable between an open state and a closed state;
a communication unit configured to communicate with an external device by wireless communication, the communication unit receiving image data to be recorded on the recording medium from the external device by the wireless communication;
a control unit configured to control operation of the communication unit according to the positional state of the display unit, the control unit controlling the communication unit such that the communication unit communicates with the external device and the image data from the external device is recorded on the recording medium if the display unit is in the open state, and the communication unit maintains communication with the external device and the image data from the external device is inhibited from being recorded on the recording medium if the display unit is in the closed state.

5. An apparatus according to claim 4, wherein the display unit displays an image in the open position and stops displaying the image in the closed position.

6. A communication apparatus comprising:
a reading unit configured to read data from a recording medium;
a display unit, a position of which is changeable between a first position and a second position;
a communication unit configured to communicate with an external device by wireless communication, the communication unit transmitting the data read from the recording medium to the external device by the wireless communication;
a control unit configured to control an operation of the communication unit according to the position of the display unit,
the control unit effecting control such that the communication unit transmits the data read from the recording medium to the external device if the display unit is in the first position, and the communication unit maintains communication with the external device and the data read from the recording medium is inhibited from being transmitted to the external device by the communication unit if the display unit is in the second position.

7. An apparatus according to claim 6, wherein the display unit displays an image in the first position and stops displaying the image in the second position.

8. A communication apparatus comprising:
a display unit, a position of which is changeable between a first position and a second position;
a communication unit configured to communicate with an external device by wireless communication;
a control unit configured to control a process of the communication apparatus according to a command from the external device received by the communication unit,
wherein the control unit changes the process of the communication apparatus in accordance with a position of the display unit so as to perform a process corresponding to a predetermined command from the external device received by the communication unit if the display unit is in the first position, and to perform the process corresponding to a command other than the predetermined command and not to perform the process corresponding to the predetermined command from the external device received by the communication unit which maintains communication with the external device if the display unit is in the second position.

9. A communication apparatus comprising:
a recording unit configured to record data on a recording medium;
a display unit, a position of which is changeable between a first position and a second position;
a communication unit configured to communicate with an external device by wireless communication, the communication unit receiving data from the external device by the wireless communication;
a control unit configured to control an operation of the communication unit according to the position of the display unit,
the control unit effecting control such that the communication unit receives the data to be recorded on the recording medium from external device if the display unit is in the first position, and the communication unit maintains communication with the external device and the data from the external device is inhibited from being recorded on the recording medium if the display unit is in the second position.

10. An apparatus according to claim 9, wherein the display unit displays an image in the first position and stops displaying the image in the second position.

11. An apparatus according to claim 6, wherein the communication unit transmits image data read from the recording medium to the external device, and the control unit effects control such that the communication unit transmits the image data read from the recording medium to the external device if the display unit is in the first position, and the communication unit maintains communication with the external device and the image data read from the recording medium is inhibited from being transmitted to the external device by the communication unit if the display unit is in the second position.

12. A communication apparatus comprising:
a reading unit configured to read data from a recording medium;
a display unit, a position of which is changeable between a first position and a second position;
a communication unit configured to communicate with an external device by wireless communication, the communication unit transmitting the data read from the recording medium to the external device using the wireless communication;
a control unit configured to select one of a first mode in which the display unit is in the first position and the communication unit transmits the data read from the recording medium to the external device and a second mode in which the display unit is in the second position, the communication unit maintains communication with the external device and the data read from the recording medium is inhibited from being transmitted to the external device.

13. An apparatus according to claim 12, wherein the display unit displays an image in the first position and stops displaying the image in the second position.

14. An apparatus according to claim 9, wherein the communication unit receives image data from the external device and the recording unit records the image data received by the communication unit, and
wherein the control unit effects control such that the communication unit receives the image data to be recorded on the recording medium from external device if the display unit is in the first position, and the communication unit maintains communication with the external device and the image data from the external device is inhibited from being recorded on the recording medium if the display unit is in the second position.

15. A communication apparatus comprising:
a recording unit configured to record data on a recording medium;
a display unit, a position of which is changeable between a first position and a second position;
a communication unit configured to communicate with an external device by wireless communication, the communication unit receiving data from the external device by the wireless communication;
a control unit configured to select one of a first mode in which the display unit is in the first position and the communication unit receives the data to be recorded on the recording medium from the external device and a second mode in which the display unit is in the second position, the communication unit maintains communication with the external device and the data from the external device is inhibited from being recorded on the recording medium.

16. An apparatus according to claim 15, wherein the display unit displays an image in the first position and stops displaying the image in the second position.

17. An apparatus according to claim 15, wherein the control unit selects one of the first mode and the second mode in accordance with the position of the display unit.

18. An apparatus according to claim 12, wherein the communication unit transmits image data read from the recording medium to the external device, the communication unit transmits the image data read from the recording medium to the external device in the first mode, and the image data read from the recording medium is inhibited from being transmitted to the external device in the second mode.

19. An apparatus according to claim 8, wherein the display unit displays an image in the first position and stops displaying the image in the second position.

20. An apparatus according to claim 8, wherein the communication unit transmits image data recorded on a recording medium, and the predetermined command is a command to obtain the image data recorded on the recording medium.

21. An apparatus according to claim 15, wherein the communication unit receives image data from the external device and the recording unit records the image data received by the communication unit, the communication unit receives the image data to be recorded on the recording medium from the external device in the first mode, and the image data from the external device is inhibited from being recorded on the recording medium in the second mode.

* * * * *